United States Patent
Zante et al.

(10) Patent No.: US 10,762,005 B2
(45) Date of Patent: Sep. 1, 2020

(54) MULTICORE DATA PROCESSING SYSTEM WITH LOCAL AND GLOBAL INPUT/OUTPUT DEVICES AND GRAPHICAL INTERFACE COMPRISING SUCH A DATA PROCESSING SYSTEM

(71) Applicant: Zodiac Aero Electric, Montreuil (FR)

(72) Inventors: Etienne Denis Marie Zante, Bourg-la-Reine (FR); Rémi Andreoletti, Chelles (FR)

(73) Assignee: Zodiac Aero Electric, Montreuil (FR)

( * ) Notice: Subject to any disclaimer, the term of this patent is extended or adjusted under 35 U.S.C. 154(b) by 338 days.

(21) Appl. No.: 14/680,443

(22) Filed: Apr. 7, 2015

(65) Prior Publication Data
US 2015/0286589 A1    Oct. 8, 2015

Related U.S. Application Data

(60) Provisional application No. 61/976,078, filed on Apr. 7, 2014.

(30) Foreign Application Priority Data

Jul. 21, 2014 (FR) .................................. 14 57008

(51) Int. Cl.
G06T 1/20  (2006.01)
G06F 13/12 (2006.01)
G06F 13/40 (2006.01)

(52) U.S. Cl.
CPC ........ *G06F 13/124* (2013.01); *G06F 13/4068* (2013.01); *G06T 1/20* (2013.01); *G06T 2210/52* (2013.01)

(58) Field of Classification Search
None
See application file for complete search history.

(56) References Cited

U.S. PATENT DOCUMENTS

| | | | | |
|---|---|---|---|---|
| 6,195,593 B1* | 2/2001 | Nguyen | ............. | G06F 17/5045 700/121 |
| 6,456,628 B1* | 9/2002 | Greim | ................ | G06F 12/0284 370/466 |
| 6,823,472 B1* | 11/2004 | DeKoning | ............ | G06F 15/167 710/56 |
| 7,324,438 B1* | 1/2008 | Savoldi | ............... | H04L 41/0631 370/216 |
| 2011/0208997 A1* | 8/2011 | Czajkowski | ........ | G06F 11/1497 714/10 |
| 2012/0269091 A1* | 10/2012 | Ahrensbach | ........ | H04L 41/0806 370/254 |
| 2014/0201472 A1* | 7/2014 | Joshua | ................ | G06F 12/0813 711/151 |
| 2015/0149713 A1* | 5/2015 | Woodmansee | ...... | G06F 12/0895 711/104 |
| 2015/0178879 A1* | 6/2015 | Palmer | .................... | G06F 9/505 345/506 |

* cited by examiner

*Primary Examiner* — Elias Mamo
(74) *Attorney, Agent, or Firm* — Kowert, Hood, Munyon, Rankin & Goetzel, P.C.; Mark R. DeLuca

(57) ABSTRACT

A multicore data processing system includes a set of data processing cores. At least a part of each data processing core includes a set of local data input and output interfaces for access to peripheral devices dedicated to said cores. It further includes a set of global data input and output interfaces for access to peripheral devices shared between said cores.

12 Claims, 3 Drawing Sheets

MULTICORE DATA PROCESSING SYSTEM WITH LOCAL AND GLOBAL INPUT/OUTPUT DEVICES AND GRAPHICAL INTERFACE COMPRISING SUCH A DATA PROCESSING SYSTEM

PRIORITY CLAIM

This application claims priority to U.S. Provisional Application Ser. No. 61/976,078 filed Apr. 7, 2014 and French Patent Application No. FR 1457008 filed Jul. 21, 2014, which are incorporated herein by reference in its entirety.

BACKGROUND OF THE INVENTION

1. Field of the Invention

The present invention relates to multicore data processing systems. In a non-limiting application, the present invention relates in particular to multicore systems for a graphical interface based on the use of a graphics processing unit (GPU) which is able to interwork with a central processing unit (CPU). The invention also generally relates to a man-machine interface using such a processing system. In a specific embodiment, the invention relates to data processing systems for man/machine interfaces installed on-board aircraft.

2. Description of the Relevant Art

A need in fact exists to have touch-sensitive man/machine interfaces on-board aircraft.

In the field of graphical interfaces, data processing systems are conventionally used to perform graphics processing operations and create graphical content intended to be displayed on a screen of the interface. This may involve, in particular, creating graphical content comprising manually manipulable touch areas, in this case by a pilot, for the performance of predefined functions.

In the prior art, data processing architectures can generally be implemented in the form of single-core CPUs, multiple central processing units (multi-CPUs) or multicore CPUs. For the implementation of graphics processing, predominantly multicore architectures are used and, in particular, graphics processing units are used that interwork with a central processing unit to increase processing power.

In the case of single-core CPUs, the basic component of an architecture of this type is the processor, which is a component enabling the interpretation of machine instructions defining computer programs.

As is known, in order that a system integrating a processor can operate, it is connected to a permanent storage device which enables the storage of the program that is to be run, to a fast memory for reading and writing the variables used in the running of the programs, and to peripherals of the input/output, communication bus, memory controller, etc., type enabling the exchange of data with the outside of the system.

Modern processors integrated on a chip also integrate a communication bus and very fast cache memory for the storage, as close as possible to the program running area, of the variables used by the program, only the relatively large or least-used variables being sent to the fast memory.

In addition to the processor, Systems on Chip (SoCs) integrate a certain number of peripherals.

Finally, microcontrollers are chips that integrate all of the elements necessary for the operation of the processor, i.e. memory and peripherals.

In the case of single-core CPUs, increasing performance requirements for the processors tend to increase progressively the frequency of operation, made possible by the ever-increasing etching fineness of the silicon. However, the increase in frequency also causes a very substantial increase in consumption, in such a way that the gain in performance becomes marginal in the face of the increase in consumption. It has therefore been proposed to replicate the processing cores in order to parallelize the running of a program, but without increasing the operating frequency.

In a conventional multicore CPU architecture, each core has a first level of cache memory, referred to as the first-level cache memory. The different cores can then share a different cache memory, referred to as the second-level cache memory. A third level of cache memory can be provided when some cores are to be combined.

The parallelization of tasks and the allocation of the instructions to be carried out to one or the other of the cores are performed via the set of instructions interpreted by the processor and by the implemented operating system (OS) which can allocate a given task according to the different cores. This is then referred to as a multicore processor. An implementation strategy of this type may also be applicable to multicore SoCs.

Another strategy consists in providing an architecture similar to the conventional architecture but, instead of parallelizing the operation, the different cores are used to render the processing more reliable. The cores execute the same instructions to within a clock pulse, and the processing operations are then compared in order to obtain a reliable operation under critical conditions. This strategy is known by the name of "Lockstep".

Another strategy consists in replicating a system rather than a core. This is then referred to as a multiprocessor. Each processor is independent and does not share a cache memory with the others. This type of architecture is generally set up externally in order to implement supercomputers or groups of networked servers to perform relatively complex processing operations requiring substantial processing resources.

In the case of GPU architectures, the graphics processing units, in the same way as CPUs, are processing architectures executing a set of instructions. However, a GPU is a processor optimized for graphics processing operations such as hardware acceleration, three-dimensional processing, video decoding, etc.

GPUs have for a long time consisted of multiple processing cores which distribute graphics tasks among themselves. This involves parallel-processing architectures. As previously indicated, GPUs are predominantly multicore units and may comprise more than 1000 cores, in the case of the most powerful. A certain number of processing operations are allocated to the different cores, to be performed by a controller.

In the case of data processing systems intended to be installed on-board aircraft, as will be understood, this type of electronic system is subject to severe constraints in terms of control of the equipment used, and of determinism, making it necessary to determine with certainty the operation of the system, for example concerning the data transfer duration. They require a validation and certification by the competent authorities. Data processing systems for the on-board man-machine interfaces for commercial aircraft must therefore comply with a certain number of development recommendations and rules.

In the prior art, on-board processing systems are generally implemented on the basis of "Commercial Off The Shelf" (COTS) components, i.e. components that are mass-produced in order to reduce production and maintenance costs. However, the use of conventional COTS components firstly causes problems of obsolescence, making it necessary to procure a large number of components and store them in order to guarantee the maintainability of the product. Given the development time and service life of a product for the aeronautical industry, which may amount to several decades, it is often the case that the components used in the design of an electronic system are in fact obsolete even before the end of the design process, making it necessary to implement periodic modification and recertification phases.

Secondly, the COTS electronic components are generally derived from consumer markets or from the telecommunications sector and are then optimized for non-aeronautical applications. Their use in the aeronautical field involves the deactivation of the original applications, their modification to make them compatible with the aeronautical field, then a certification, incurring additional costs.

Furthermore, standard multicore processing systems comprise only peripheral systems and memories shared among the different processing cores. The cores communicate with data input and output interfaces via a common interface bus to access resources shared between the cores. This results in a requirement for arbitration in the potentially concurrent access to said peripheral systems. This concurrent access is managed in a conventional COTS system by an uncontrolled coherence system. The use of COTS components in an aeronautical system therefore requires the implementation of a large number of software and hardware locks to guarantee the operation of the components while following the recommendations of the certification authorities. The addition of these locks entails a substantial degradation in the performance of the central data processing units.

SUMMARY OF THE INVENTION

In light of the above, the embodiments described herein propose to mitigate problems of determinism in the concurrent access situations encountered in the multifunction data processing systems by limiting the arbitrations implemented upon access to shared resources.

In one embodiment, a multicore data processing system, includes a set of data processing cores and in which at least a part of each data processing core includes a set of local data input and output interfaces for access to peripheral devices dedicated to said cores.

The system further includes a set of global data input and output interfaces for access to peripheral devices shared between said cores.

Thus, by providing local input and output interfaces each of the processing cores has access to its own memories and/or local peripheral systems so that each processing core is totally independent and autonomous with respect to the others. Each of the processing cores is therefore capable of operating without interaction with the other cores.

According to an embodiment, the system includes a set of at least one central processing unit comprising data processing cores that include said local interfaces and said global interfaces. In other words, the processing cores constitute a central processing unit CPU.

According to an embodiment, the multicore system includes a set of at least one graphics processing unit comprising data processing cores that include said local interfaces and said global interfaces. The data processing cores thus constitute graphics processing units.

In one embodiment, the system includes at least one central processing unit and at least one graphics processing unit which communicates with the central processing unit, the processing cores of the central processing unit being each connected to a processing core of the graphics processing unit via a single data transfer means in such a way as to implement a data transfer in parallel between said graphics processing unit and said central processing unit.

There is thus obtained an increase in the processing power while addressing the problem of aeronautical certification by multiplying the CPU/GPU processing cores in order to obtain a cloned architecture having the same task parallelization advantages as a multicore architecture, while limiting the disadvantages of complexity and optionally of uncontrolled shared resources which are not conceivable for reasons of aeronautical safety and criticality.

Advantageously, the data processing cores are connected to an internal local data transfer device connected to said interfaces.

The local internal data transfer device may be connected to peripheral devices each dedicated to one processing core.

Moreover, the data processing cores are advantageously connected to a global data transfer device internal to said graphics processing unit or to said central processing unit and connected to peripheral devices shared between the processing cores.

Preferably, at least a part of each processing core includes a dedicated operating system.

A further embodiment relates to a graphical interface for an aircraft cockpit that includes a multicore data processing system as defined above.

BRIEF DESCRIPTION OF THE DRAWINGS

Other objects, characteristics and advantages of the invention will become apparent from a reading of the detailed description which follows, given purely by way of a non-limiting example, with reference to the attached drawings, in which.

Figure 1:
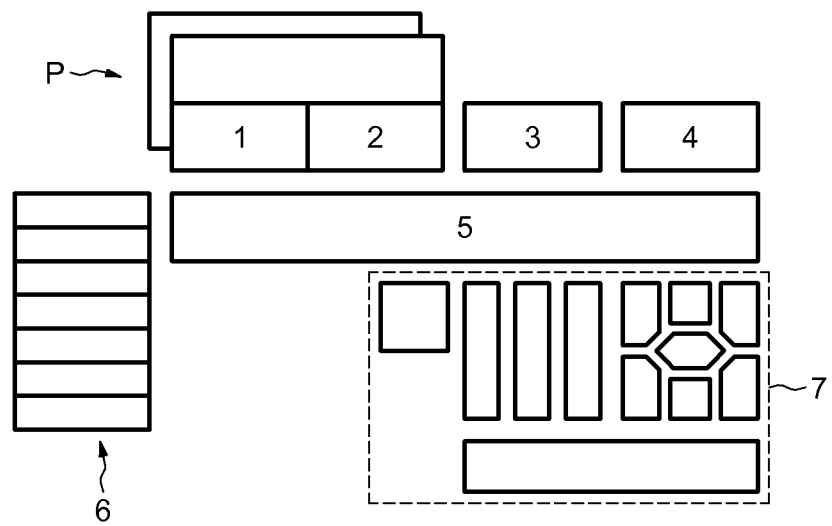
FIG. 1 illustrates the general architecture of a conventional data processing system produced from COTS components.

While the invention may be susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION OF THE PREFERRED EMBODIMENTS

It is to be understood the present invention is not limited to particular devices or methods, which may, of course, vary. It is also to be understood that the terminology used herein is for the purpose of describing particular embodiments only, and is not intended to be limiting. As used in this specification and the appended claims, the singular forms "a", "an", and "the" include singular and plural referents unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected.

Reference will be made first of all to FIG. 1, which illustrates the architecture of a multicore data processing system according to the prior art, using commercial off-the-shelf components COTS.

As can be seen in FIG. 1, this data processing system is hinged around a dual-core processor P associated with local cache memories 1 and 2, dedicated respectively to the storage of data and to the storage of instructions, and with a higher level shared cache memory 3 used when the local cache memories 1 and 2 are full and associated with a shared memory controller 4 allowing access to external memories, for example of DDR (double data rate) type.

A common bus 5 incorporating a cache consistency protocol associated with first communication control peripheral devices 6 and second input and output peripheral devices 7 ensures the exchange of data with the processor P.

As indicated previously, this type of architecture presents a certain number of drawbacks relating to the sharing of the cache memory 3, of the memory controller 4 and of the common bus 5.

The use of shared means specifically requires the provision of an extensive arbitration in order to authorize access to the processor. Furthermore, the data transfer time on the common bus is not guaranteed. In particular, when the number of cores increases, the management of priorities and the calculation of access times becomes more complex to perform. Furthermore, the number of inputs and outputs is limited.

The deterministic operation of this type of component, notably concerning the data transfer time, which cannot be determined with certainty without employing costly means, is therefore not guaranteed.

Figure 2:
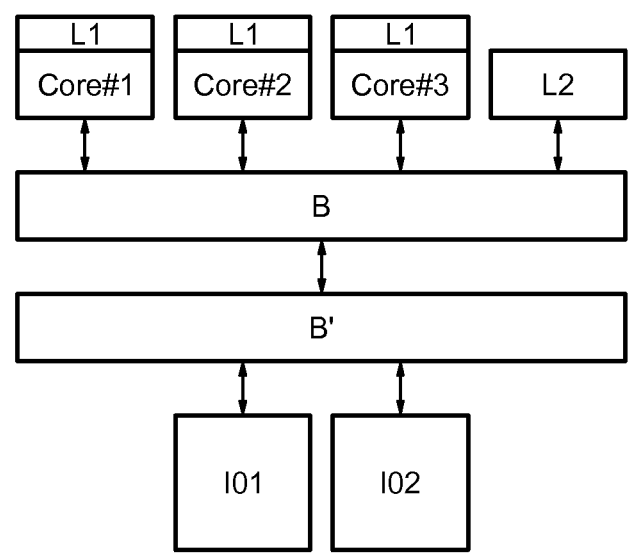
FIG. 2 is a block diagram of a part of a conventional multicore data processing system, showing the sharing of peripheral devices.

Now referring to FIG. 2, in which a number of data processing cores "core#1", "core#2", "core#3" are schematically represented, each associated with a cache memory L1 and with a high level cache memory L2 which communicate via local bus B, it can be seen that, according to a conventional architecture, input/output (I/O) interfaces such as IO1 and IO2 ensure the communication with traditionally shared external devices such that the access to these input/output interfaces which is performed via an interface bus B' involves an access arbitration.

As indicated previously, the traditional multicore architectures, intended to be embedded onboard aircraft, have to be subject to development rules and recommendations published by the certification authorities. These rules economically and technically penalize the development of an architecture based on COTS components.

Figure 3:
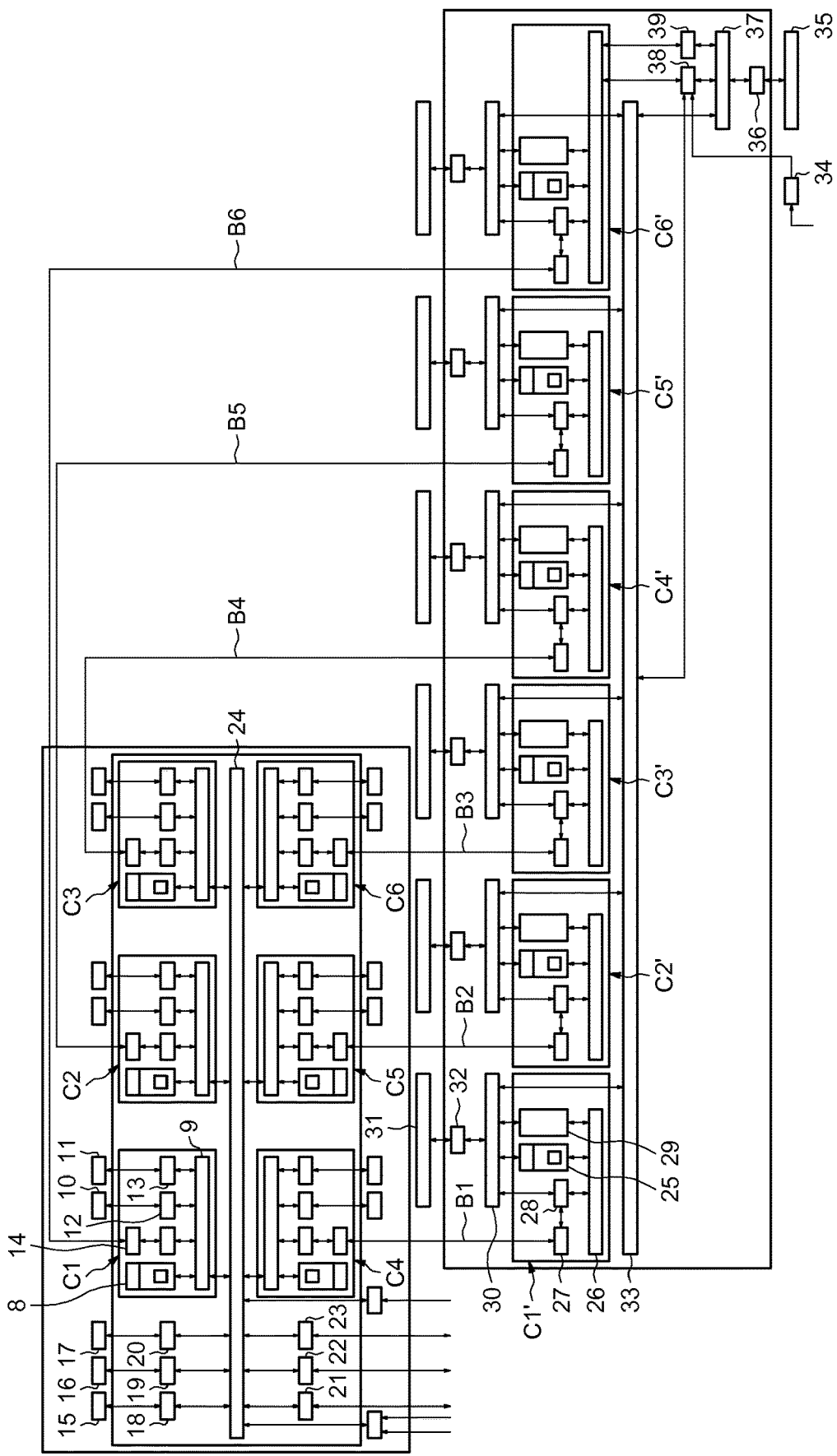
FIG. 3 shows the general architecture of a data processing system.

FIG. 3 shows the general architecture of a multicore data processing system, according to an embodiment, for graphical interface.

To meet the rules and recommendations published by the certification authorities, all the memories (Flash, RAM, Cache) are here separated between the cores to thus limit the use of shared resources. To guarantee a deterministic access to all the other shared resources, a partitioned communication element is used to handle the communication of the different CPU cores. This element can, for example, be a bus or a network on chip NoC.

The same strategy is used for the GPU cores. The GPU cores are independent and are connected to a single CPU core via a dedicated bus. Each GPU core produces a graphics image connected to the application which it manages. The different images produced are then assembled by a mixer, ultimately to produce a screen image which is intended to be displayed on the screen of a man-machine interface.

Each CPU/GPU pair thus hosts a graphics application distinct and independent from the others. This architecture therefore enables the development in parallel and by a plurality of suppliers of man-machine interface applications for different commercial avionics systems. This entirely partitioned architecture enables the implementation of an incremental certification. In other words, it is possible to update one core without impacting on the others.

FIG. 3 shows that the central processing unit CPU and the graphics processing unit GPU each include a group of data processing cores C1-C6 and C'1-C'6 respectively, in this case six in number, interconnected via dedicated buses B1-B6 or, in a general manner, via a dedicated data transfer device.

The problems of arbitration and non-guaranteed data transfer time no longer arise in this architecture, the data being transported between the processing cores on non-shared buses.

As can be seen, the data processing cores of the central processing unit are organized on the same model and are based on the use of one processing core, such as 8. Each processing core comprises an internal communication bus 9 or, in a general manner, a data transfer device, which performs the communication within the core between the various components which make it up and with local peripheral devices.

Each processing core in fact includes different types of memory with, inter alia, a permanent memory 10, for example a Flash memory, and a random access memory 11, for example a DDR memory, associated with a permanent memory controller 12 and a random access memory controller 13. Obviously, equipping the processing cores with other types of local peripheral devices, notably other types of memory, does not exceed the scope of the invention. As will be described with reference to FIG. 4, each processing core also includes a certain number of local data input and output peripherals which may differ from one core to the other.

Communication peripherals 14 perform the communication between the dedicated buses B1-B6 and the associated internal communication bus 9.

Alongside the local peripherals and memories 10 and 11 dedicated to each processing core, the central processing unit CPU furthermore includes global memories and peripherals shared among the cores. This concerns, in particular, the memories 15, 16 and 17 associated with their respective memory controllers 18, 19 and 20. By way of illustration, but in a non-limiting manner, this concerns Flash memories, DDRs or global shared peripherals 21, 22 and 23, for example ARINC 429 or ARINC 825. In the proposed application, which relates to graphical interfaces for cockpit equipment for aircraft, memories of this type may, for example, be used for recording information relating to a flight.

A global internal bus 24 or, in a general manner, a data transfer element, performs the exchange of data between the data processing cores C1-C6, with the memories 15, 16 and 17 and with the global peripheral devices 21, 22 et 23.

The data processing cores C' 1-C'6 of the graphics processing unit have a similar structure and are based on the use of a processing core such as 25. This processing core 25 communicates with an internal communication bus 26 or, in a general manner, with a data transfer means, which is connected via communication links 27 and 28 to the dedicated buses B1-B6.

Alongside the processing core 25, each data processing core C' 1-C'6 furthermore incorporates a GPU graphics processing core 29 connected to the internal bus 26. Finally, a local bus 30 or a data transfer means, which communicates with the communication links 27 and 28, with the processing core 25 and with the GPU processing core 29, is connected to an external local memory 31 associated with a corresponding controller 32.

Furthermore, the graphics processing unit GPU comprises a mixer 33 connected to the local bus 30 of each data processing unit C' 1-C'6.

In fact, each CPU/GPU pair performs a task which is allocated to it and generates a portion of the final image. The mixer 33 combines these various images to produce the final screen displayed on the man-machine interface. Optionally, the processing system that has just been described may be equipped with a video input 34, an external memory 35 associated with a corresponding controller 36 and with an arbitration system 37 for accessing external shared data. An image retrieval device 38 associated with a flow manager 39 combines videos or images retrieved from the input 34 or the memory 35 in order to generate the final image.

As will be understood, the architecture that has just been described can be likened to a multiprocessor architecture integrated onto one and the same chip. In fact, since each core is independent and has its own dedicated memory controllers and peripherals, the architecture is similar to a multi-SoC architecture.

Figure 4:
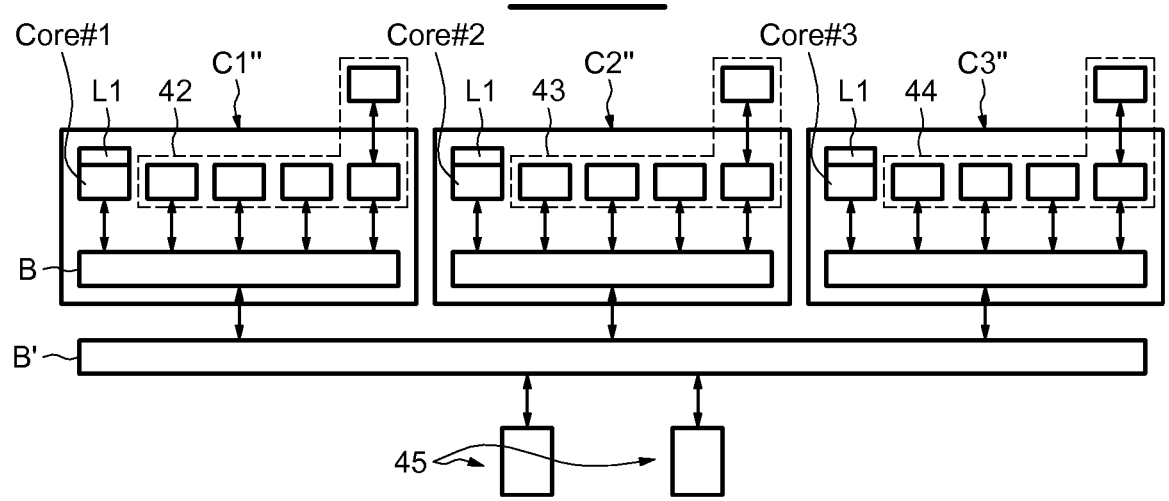
FIG. 4 shows a part of a data processing system showing the use of peripherals dedicated to each processing core and shared peripheral devices.

With reference to FIG. 4, which shows a strategy for installing an operating system in a data processing system, it can be seen that each processing core, denoted C"1, C"2 or C"3, incorporates a certain number of Input/Output interfaces 42, 43, 44 which communicate with a core "core#1", "core#2" or "core#3" via a local bus B, while other Input/Output interfaces 45 are shared among the processing cores with which they communicate via an interface bus B'. This strategy may apply equally to both the central processing unit and the graphics processing unit. In other words, two Input/Output interface levels are provided, the architecture integrating not only local Input/Output interfaces dedicated to a core, but also global Input/Output interfaces which are shared among the cores.

It will be understood that the direct-access local I/O interfaces, without sharing and without arbitration, enable faster access to local peripherals dedicated to one core, whereas the global I/O interfaces enable access to shared peripheral devices.

It will moreover be noted that, in one implementation, the processing cores of the GPU and of the CPU can incorporate a dedicated operating system.

The deterministic access to the shared resources makes the use of a controlled shared access bus 24 (FIG. 5) desirable.

The bus 24 is thus associated with arbitration means serving to arbitrate the data exchanges with the shared devices or, in other words, to arbitrate access by the cores to the shared resources. By way of example, these arbitrations may take the form of a scheduler, for example integrated into the bus, periodically allocating communication times for each core in succession.

Figure 5A:
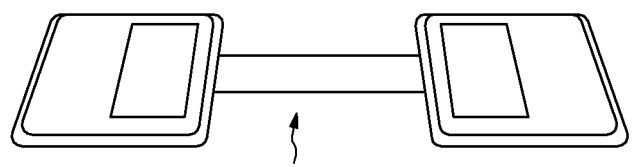
FIGS. 5A and 5B are views showing the coupling between a CPU and GPU according to the prior art and according to the embodiments described herein, respectively.
Figure 5B:
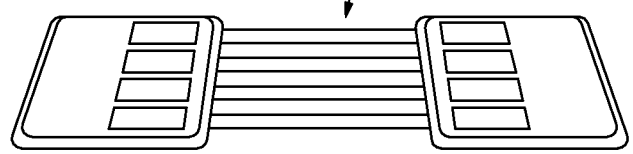

Finally, referring to FIG. 5A and FIG. 5B, it is conceivable for, contrary to the conventional CPU/GPU architectures which use a single shared communication bus 46, the data processing system according to the embodiments described herein to be based on an independent dedicated bus 47 between each CPU core and its associated GPU core. These separate buses thus allow parallel and efficient data transfers.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A multicore data processing system, comprising:
at least one graphics processing unit (GPU) comprising a set of data processing cores, wherein at least a part of each data processing core comprises a set of local data input and output interfaces for access to a plurality of dedicated external peripheral devices, wherein each of the local data input and output interfaces is a direct access interface configured to operate without global sharing and without arbitration, wherein each of the plurality of dedicated external peripheral devices communicates with a corresponding one of the set of data processing cores via a local bus;
at least one central processing unit (CPU), wherein the at least one graphics processing unit (GPU) which communicates with the central processing unit, wherein each of a set of data processing cores of the central processing unit are connected to a processing core of the graphics processing unit by a single data transfer device so as to produce a parallel data transfer between said graphics processing unit and said central processing unit; and
a set of global data input and output interfaces for access to peripheral devices shared between ones of said set of data processing cores;
wherein said data processing cores communicate with each other via a global bus.

2. The multicore system according to claim 1, further comprising a central processing unit (CPU) comprising the set of the data processing cores that each comprise said local interfaces and said global interfaces.

3. The multicore system according to claim 1, wherein each of the set of data processing cores are connected to the local bus via the local data input and output interfaces.

4. The multicore system according to claim 3, wherein said local bus is connected to a plurality of peripheral devices each dedicated to a processing core, the plurality of peripheral devices including the plurality of external peripheral devices.

5. The multicore system according to claim 1, wherein each of the set of data processing cores is connected to a global data transfer device internal to said graphics processing unit or to said central processing unit and connected to peripheral devices shared between each of the set of data processing cores.

6. The multicore system according to claim 1, wherein at least a part of each of the set of data processing cores comprises a dedicated operating system.

7. A graphical interface for an aircraft cockpit, comprising a multicore data processing system, the multicore data processing system comprising:
   a set of data processing cores, wherein at least a part of each data processing core comprises a set of local data input and output interfaces for access to a plurality of dedicated external peripheral devices, wherein each of the local data input and output interfaces is a direct access interface configured to operate without sharing and without arbitration, wherein each of the plurality of dedicated external peripheral devices dedicated to said cores communicates with a corresponding one of the set of data processing cores via a local bus; and
   a set of global data input and output interfaces for access to peripheral devices shared between ones of said set of data processing cores;
   wherein ones of said set of data processing cores communicate with each other via a global bus
   further comprising at least one graphics processing unit (GPU) comprising the set of data processing cores that comprises said local interfaces and said global interfaces
   further comprising at least one central processing unit (CPU) and at least one graphics processing unit (GPU) which communicates with the central processing unit, wherein each of a set of data processing cores of the central processing unit is connected to a processing core of the graphics processing unit by a single data transfer device so as to produce a parallel data transfer between said graphics processing unit and said central processing unit.

8. The graphical interface according to claim 7, further comprising a set central processing unit (CPU) comprising the set of data processing cores that each comprise said local interfaces and said global interfaces.

9. The graphical interface according to claim 7, wherein each of the set of data processing cores are connected to the local bus via the local data input and output interfaces.

10. The graphical interface according to claim 9, wherein said local bus is connected to a plurality of peripheral devices each dedicated to a one of the set of data processing cores, the plurality of peripheral devices including the plurality of external peripheral devices.

11. The graphical interface according to claim 7, wherein each of the set of data processing cores is connected to a global data transfer device internal to said graphics processing unit or to said central processing unit and connected to peripheral devices shared between ones of the set of data processing cores.

12. The graphical interface according to claim 7, wherein at least a part of each of the set of data processing cores comprises a dedicated operating system.

* * * * *

UNITED STATES PATENT AND TRADEMARK OFFICE
CERTIFICATE OF CORRECTION

PATENT NO. : 10,762,005 B2
APPLICATION NO. : 14/680443
DATED : September 1, 2020
INVENTOR(S) : Etienne Denis Marie Zante and Remi Andreoletti Page 1 of 1

It is certified that error appears in the above-identified patent and that said Letters Patent is hereby corrected as shown below:

In the Claims

Claim 8, Column 10, Line 11, please delete "set".

Signed and Sealed this
Thirteenth Day of October, 2020

Andrei Iancu
*Director of the United States Patent and Trademark Office*